US008159463B2

(12) United States Patent
Weiner (10) Patent No.: US 8,159,463 B2
(45) Date of Patent: Apr. 17, 2012

(54) APPARATUS FOR THE DISPLAY OF EMBEDDED INFORMATION (75) Inventor: Michael L. Weiner, Ormond Beach, FL (US)

(73) Assignee: Technology Innovations, LLC, Pittsford, NY (US)

( * ) Notice: Subject to any disclaimer, the term of this patent is extended or adjusted under 35 U.S.C. 154(b) by 783 days.

(21) Appl. No.: 12/210,378

(22) Filed: Sep. 15, 2008

(65) Prior Publication Data

US 2009/0085900 A1    Apr. 2, 2009

Related U.S. Application Data (63) Continuation of application No. 09/860,916, filed on May 18, 2001, now Pat. No. 7,429,965.

(60) Provisional application No. 60/205,451, filed on May 19, 2000.

(51) Int. Cl.
G06F 3/041    (2006.01)
(52) U.S. Cl. .......................... 345/173; 345/30
(58) Field of Classification Search ................ 345/7, 30, 345/156–173, 204
See application file for complete search history.

(56) References Cited

U.S. PATENT DOCUMENTS

| | | |
|---|---|---|
| 4,475,222 A | 10/1984 | Egendorf |
| 4,835,376 A | 5/1989 | Drexler |
| 5,086,516 A | 2/1992 | Baxter et al. |
| 5,124,814 A | 6/1992 | Takahashi et al. |
| 5,416,310 A | 5/1995 | Little |
| 5,455,410 A | 10/1995 | Schneider |
| 5,479,003 A | 12/1995 | Yamada |
| 5,509,144 A | 4/1996 | Soergel et al. |
| 5,517,407 A | 5/1996 | Weiner |
| 5,708,525 A | 1/1998 | Sheridon |
| 5,747,928 A | 5/1998 | Shanks et al. |
| 5,751,268 A | 5/1998 | Sheridon |
| 5,912,653 A | 6/1999 | Fitch |
| 5,914,805 A | 6/1999 | Crowley |
| 5,974,025 A | 10/1999 | Yamada et al. |
| 5,981,123 A | 11/1999 | Matsuo et al. |
| 6,017,584 A | 1/2000 | Albert et al. |
| 6,019,284 A | 2/2000 | Freeman et al. |
| 6,055,091 A | 4/2000 | Sheridon et al. |
| 6,124,851 A | 9/2000 | Jacobson |

(Continued)

FOREIGN PATENT DOCUMENTS

| | | |
|---|---|---|
| WO | WO0067110 | 11/2000 |
| WO | WO0191045 | 11/2001 |
| WO | WO0191097 | 11/2001 |

OTHER PUBLICATIONS

An unofficial file history as of Apr. 28, 2009 for U.S. Appl. No. 09/860,734.

(Continued)

Primary Examiner — Nitin Patel
(74) Attorney, Agent, or Firm — Duane C. Basch; Basch & Nickerson LLP (57) ABSTRACT An apparatus for the electronic display of information, where the apparatus is a substrate incorporating a digital recording medium attached to or embedded within the substrate. The substrate further includes a flexible-substrate display located on an exposed surface of the substrate, where the display is a medium capable of selectively displaying one of at least two possible colors at each pixel location thereon in order to produce a substrate medium that may be modified in accordance with a user's selection.

5 Claims, 10 Drawing Sheets

U.S. PATENT DOCUMENTS

| | | | |
|---|---|---|---|
| 6,252,564 | B1 | 6/2001 | Albert et al. |
| 6,402,039 | B1 | 6/2002 | Freeman et al. |
| 6,441,921 | B1 | 8/2002 | Soscia |
| 6,490,402 | B1 | 12/2002 | Ota |
| 6,594,927 | B2 | 7/2003 | Witkowski |
| 6,639,578 | B1 | 10/2003 | Comiskey et al. |
| 6,652,075 | B2 | 11/2003 | Jacobson |
| 6,753,830 | B2 | 6/2004 | Gelbman |
| 6,825,829 | B1 | 11/2004 | Albert et al. |
| 6,924,781 | B1 * | 8/2005 | Gelbman ............... 345/85 |
| 7,429,965 | B2 * | 9/2008 | Weiner ............... 345/30 |
| 2001/0020935 | A1 | 9/2001 | Gelbman |
| 2001/0043164 | A1 | 11/2001 | Thagard |
| 2002/0091659 | A1 * | 7/2002 | Beaulieu et al. ............ 706/62 |
| 2002/0167500 | A1 | 11/2002 | Gelbman |
| 2005/0007336 | A1 | 1/2005 | Albert et al. |
| 2005/0122564 | A1 | 6/2005 | Zehner et al. |

OTHER PUBLICATIONS

An unofficial file history as of Apr. 28, 2009 of US Patent 7,429,965.
An unofficial file history as of Apr. 28, 2009 for U.S. Appl. No. 60/205,451.
Electronic Ink Makes Chicago Debut at Area JC Penney Department Stores.
Resnic et al.; E Ink demonstrates high Resolution with World's 1st Matrix Electronic Ink Display.
The Future of the Book, media.mit.edu/micromedia/images/pubs/future.jpg Feb. 1, 1996.
Vizard, F.; Electric Tales; Popular Science; Jun. '97.
Jacobson et al.; Electronic Paper; media.mit.edu/micromedia/elecpaper.html.
Glave, J.; Inventor Warns MS on Patents; Wired Digital Inc. Wired Magazine, © 1994-1999; May 11, 1998.

* cited by examiner

APPARATUS FOR THE DISPLAY OF EMBEDDED INFORMATION

CROSS-REFERENCE TO RELATED APPLICATIONS

This application is a continuation of U.S. application Ser. No. 09/860,916 filed May 18, 2001 now U.S. Pat. No. 7,429,965 and claims priority to U.S. application Ser. No. 09/860,916 which claims priority from Provisional Application 60/205,451 by Michael Weiner titled "DOCUMENT WITH EMBEDDED INFORMATION," filed May 19, 2000, both of which are hereby incorporated by reference in their entirety.

The following related application is hereby incorporated by reference for its teachings "DOCUMENT WITH EMBEDDED INFORMATION," Michael Weiner et al., abandoned application Ser. No. 09/860,734 filed May 18, 2001.

BACKGROUND AND SUMMARY OF THE INVENTION

This invention relates generally to the display of embedded information, and more particularly to the combination of a digital memory and a substrate to produce a self-contained information storage and display device, such as a "book-on-a-chip." However, the present invention is not limited to traditional substrates, and may include cloth or wall coverings, and "e-paintings" that are mat-able The present invention is an apparatus for embedding digital information within a document substrate and displaying that information via the substrate. It has long been desirable to capture, in electronic format the image found on the printed page. To facilitate this need, many organizations use image scanners and optical character recognition devices. However, scanning or digitizing a document image can be quite difficult, particularly when one seeks to accurately redisplay such an image or to modify it.

It is known, as demonstrated by companies such as E Ink Corporation, and Xerox' Palo Alto Research Center (PARC) that a thin, flexible substrate may be used to produce re-writeable images, in dual (e.g., black and white, blue and white) or multi-colored formats. However, the present invention is directed to the combination of such media or display technology with an embedded or associated data source so as to make the combination useful—taking the display technology from a mere novelty to a practical and time-saving device in accordance with the various embodiments described herein.

As is suggested herein, it is possible to store and access information associated with a substrate that also displays all or portions of the stored information. For example, display means such as e-ink, electric paper, gyricons, etc. may be used to produce a "book-on-a-chip" or similar display device. Furthermore, the present invention is not limited to traditional paper substrates, and may include textiles and fabrics such as clothing, where a user might be able to wear the substrate as a T-shirt or a "baseball cap" and where the information or appearance of the cloth substrate could change. Other applications as will be described herein include wall coverings and "e-paintings" that are mat-able, placemats, etc.

As will be appreciated by those familiar with the new display techniques, the advantage of re-writeable substrate materials, combined with a tailored information source (content including text, images, etc.) is that a user then has a portable system by which the information may be accessed. Furthermore, such a system may make it easier for a user to become accustomed to reading a "book" using this new technology.

Heretofore, other patents and publications have disclosed the embedding of information, the relevant portions of which may be briefly summarized as follows:

U.S. Pat. No. 5,517,407 to Weiner teaches a means of embedding memory into a book and then searching a microchip or other memory using a common connector. If this system were to come into vogue then copiers and printers could output to that type of memory and connector, and take advantage of an installed base of users.

Xerox Corporation announced in 1998 an "electronic staple" that holds the URL address of one or more pages on the Internet that relate to the printed page. Similarly, electric paper described by Sheridan et al., and an alternative invention by MIT Media Lab (E-Ink) disclose mechanisms for dynamically displaying information on a flexible substrate. These pages can be imaged electronically and have a variety of advantages and differences from ordinary paper that is taught in U.S. Pat. Nos. 5,708,525, 5,751,268, 5,914,805 and 6,055,091 assigned to Xerox Corporation, and as also described by J. Jacobson et al. in various papers and patents prepared on electronic paper, electronic books and "e-ink," Including U.S. Pat. Nos. 6,017,584, 6,124,851 and publication WO 00/67110

In accordance with an aspect of the present invention, there is provided a substrate for the electronic display of information, comprising: a digital recording medium associated therewith, where information may be stored by the digital recording medium attached to the substrate; and an updateable substrate display located on an exposed surface of the substrate, wherein said substrate display includes a display medium capable of selectively displaying one of at least two possible colors at each pixel location thereon; where the substrate display changes state in response to a signal generated from information stored in the digital recording medium.

One aspect of the invention is based on the recognition of an opportunity for the use of new technologies in association with conventional goods. In particular, the development of flexible-substrate displays, and small, embeddable memory devices allows the novel combination of the two to provide improved uses thereof, including consumer goods, packaging, information sources, etc.

The present invention is advantageous because it can be produced inexpensively and is reusable, compared to other approaches, providing a way in which to display information or to alter the appearance of goods using the flexible-substrate displays. The invention can be adapted to any of a number of consumer goods and applications. The techniques of the invention are advantageous because they provide a range of alternatives, each of which is useful in appropriate situations. Some of the techniques can be used to modify or alter the appearance of goods, or information displayed thereon, in response to a users request.

The present inventions will be described in connection with a preferred embodiment, however, it will be understood that there is no intent to limit the inventions to the embodiment described. On the contrary, the intent is to cover all alternatives, modifications, and equivalents as may be included within the spirit and scope of the inventions as defined by the appended claims.

DESCRIPTION OF THE PREFERRED EMBODIMENTS

For a general understanding of the present invention, reference is made to 25 the drawings. In the drawings, like reference numerals have been used throughout to designate identical elements.

Figure 1:
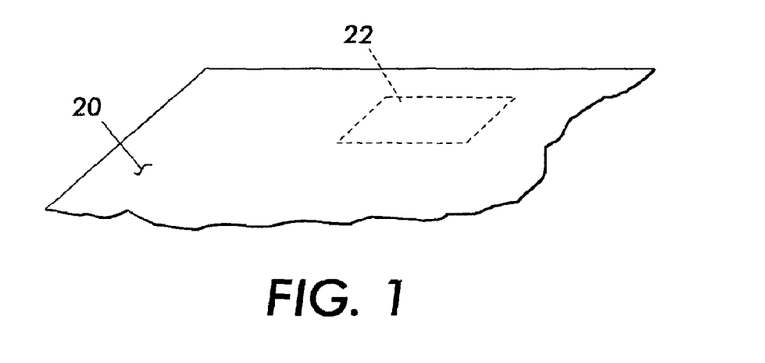
FIGS. 1-3 illustrate various embodiments for a substrate in accordance with one aspect of the present invention.
Figure 2:
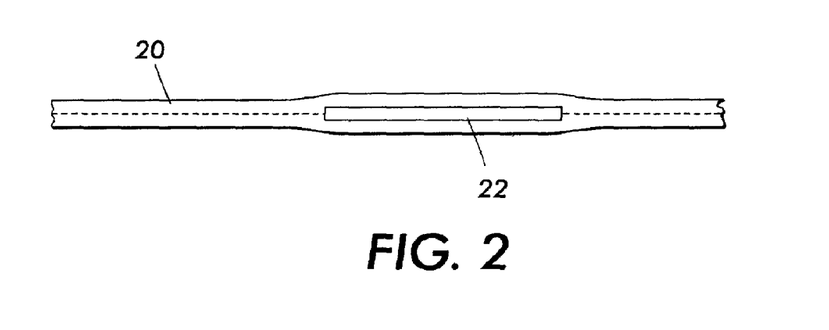
Figure 3:
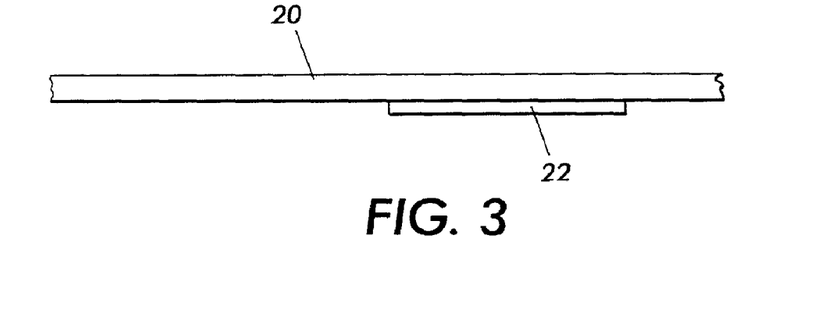

Referring to FIGS. 1-3, there are depicted illustrative embodiments of an aspect of the present invention. In particular, there is shown a substrate sheet having a memory device 22 embedded within or attached to a surface thereof. In the embodiment of FIG. 2, the embedded memory device 22 is physically embedded within or between one or more layers of the substrate, possibly during its manufacture, so as to be concealed from visual detection by a viewer of the substrate. The substrate 20 may include a paper or comparable textile-based substrate, a portion of which may be conducive to various marking, copying, printing or silk-screening tasks, such as ordinary bond paper, cloth or linen paper, of any size, weight and color; and may also include other materials such as transparency materials, vinyl, labels, card stock, vellum, cotton, Nylon®, polyesters, Tyvek®, etc. As described below, other components associated with the memory may also be embedded with or affixed to the substrate material. It is further contemplated, and applicable to many of the applications described below, that the substrate may include another, upper layer to waterproof, weatherproof or otherwise seal a surface of the substrate from its environment. Such a substrate may be used outdoors, perhaps affixed to the outside of a vehicle or structure.

It is also understood that all or a portion of the substrate, a layer thereof, or a display area associated therewith, may be in the form of electric paper employing twisted balls or cylinders, gyricons, as taught by Sheridon et al., for example, in U.S. Pat. Nos. 5,708,525, 5,751,268, 5,914,805 and 6,055,091 assigned to Xerox Corporation, and as also described by J. Jacobson et al. in various papers prepared on electronic paper, electronic books and "e-ink." Moreover, such display substrate materials, while flexible by design, may be employed in embodiments where the substrate and associated display are maintained in a rigid condition (e.g., a frame-mounted and/or matted configuration).

Similarly, in the embodiment of FIG. 3, the embedded memory device 22 is physically attached to a surface (upper or lower) of substrate 20. In any of the various embodiments, it is intended that the substrate be usable in the same manner as conventional paper, textiles or similar substrate materials. Such uses necessarily include ink and xerographic printing, silk-screening, photography, painting and other methods of placing marks or images on the substrate, as well as post-marking manipulation of the substrate. As contemplated by the present invention, the substrate may be employed as "pages" in an electronic book, as product packaging, or as an article of clothing wearable by a user.

The embedded memory 22 is preferably a type of semiconductor memory. Semiconductor memory continues to enjoy the benefits of increasing capacity and reduced cost, and flash memory and equivalents now allow putting information in memory without the time consuming and costly masking process traditionally associated with programmable devices. Information can be burned into semiconductor memory on demand.

Embedded memory device 22 may also be a chip, a strip of bubble memory, or a laser imageable surface, as described, for example, in U.S. Pat. No. 4,835,376 to Drexler, and as described in an article by Wired News, "Inventor Warns MS on Patents," by James Glave, May 11, 1998. Alternatively, the memory may be in the form of a conventional magnetic tape or strip (e.g., recording tape or magnetic card strip) that is embedded or applied to the substrate. In yet another alternative embodiment, the embedded memory may be an optical or laser-imageable medium such as found in a CD ROM, wherein the embedded memory can contain information embedded by laser on the flat surface and later read by a reader. Examples of such technology are U.S. Pat. No. 4,835,376 to Drexler In any of the various substrate-memory embodiments, it is possible to either embed into the print/copy substrate, or to affix onto it, embedded memory 22, positioned in such a way as to allow information to be transferred into the memory, and for information to be retrieved therefrom.

Figure 4:
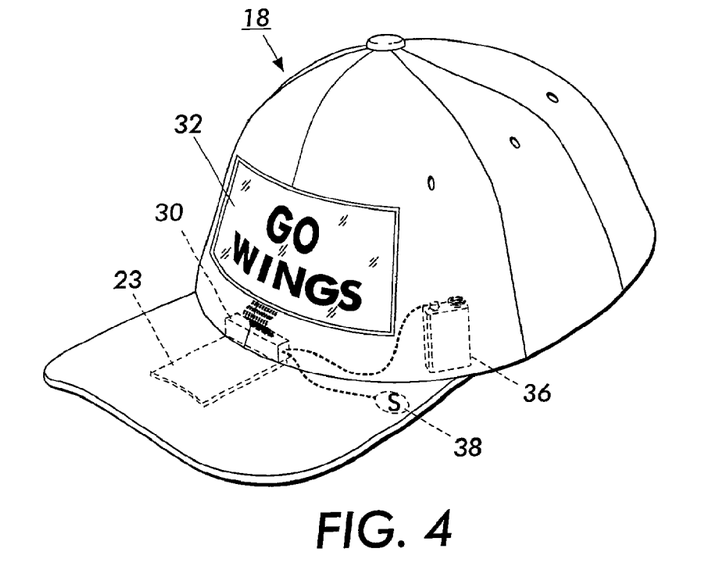
FIGS. 4-7 illustrate particular applications of the substrate of FIG. 1 in conjunction with a flexible-substrate display in accordance with another aspect of the 30 present invention.
Figure 5:
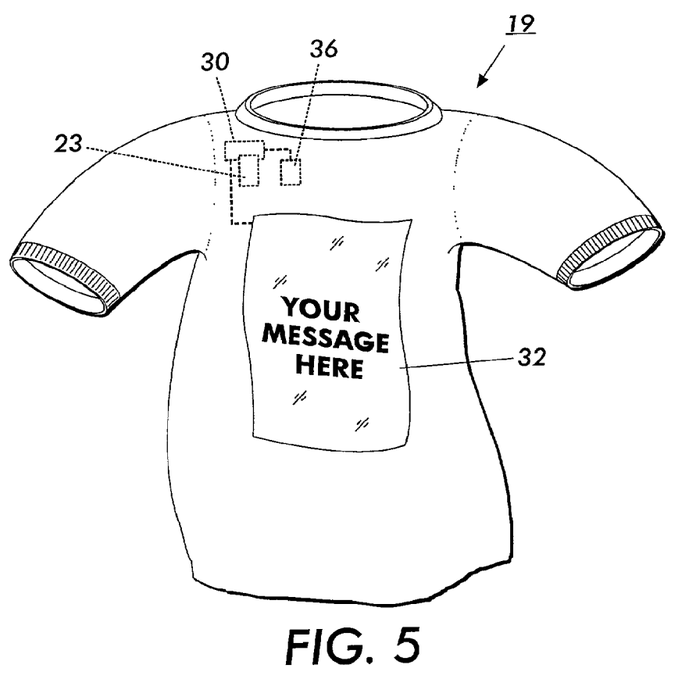

Depicted in FIGS. 4 and 5 are other possible embodiments of a digital recording medium associated with the substrate—one employing a "Memory Stick" recently introduced by Sony or similar detachable memory device. In FIG. 4, the present invention is illustrated in the form of a wearable hat 18 whereas in FIG. 5 the invention is depicted as an item of clothing such as a T-shirt 19. In both of the embodiments, memory in the form of a memory 23 is an ultra-small, high-capacity durable media designed to link a host of different digital products by capturing and sharing digital content—whether images, text or audio (e.g., music) files. Sony's line of memory stick products includes Cyber-shot digital cameras, Handycam camcorders, VAIO personal computers, a Memory Stick Walkman personal stereo, a voice recorder, a Memory Stick printer, the CyberFrame digital photo frame, and AIBO entertainment robot. The storage device is available as a 64 MB capacity Memory Stick, and larger capacity.

In the memory stick, a tiny microcontroller connects to a flash memory chip on one end. On the other end a 10-pin flat-contact connector with guide grooves on the Memory Stick's underside ensures reliable data exchange up to a million times. A compatible flat-contact connection or port 30 would be required to be connected to the display 32 and other circuitry components in the present embodiment. Because data is contained on a silicon chip instead of on a tape or disk, no motor, magnetic head or optical pickup is necessary. This allows products to be smaller, lighter and more efficient.

Memory Stick's RAM holds data for an indefinite period and withstands heat, dust and rough handling.

As depicted in FIGS. 4 and 5, each of the wearable embodiments may include a port, preferably having a controller 30 associated therewith for processing data driving or controlling the display 32. Moreover, such a system would require a is power source such as a replaceable battery 36 or renewable portable power supply (e.g., a photovoltaic array (not shown) which may also be integrated with the substrate or article worn by the user). As a further aspect, depicted for example in FIG. 4, an external signal generator such as switch 38 may be employed to allow the wearer to alter the display between one of a plurality of display selections available in the memory.

The Memory Stick provides instant data transfer, and data can be recorded, erased and re-recorded. In a preferred embodiment, the embedded memory device is not only flexible in nature, preventing it from interfering with the normal or intended use of the substrate, but also very dense in terms of the information that can be stored thereon. Embedded memory 22 and removable memory 23 are both preferably suitable for use in storing information, such as information related to the image, on the substrate. For example, the stored information may include a bitmap image(s), an alternative version of the document (e.g., text-only, translation for another language), information relative to the transfer or reproduction of the document image, or other machine-readable information relevant to the document (e.g., bibliographic, footnotes, related URLs, appendices, indexes, etc.).

Figure 6:
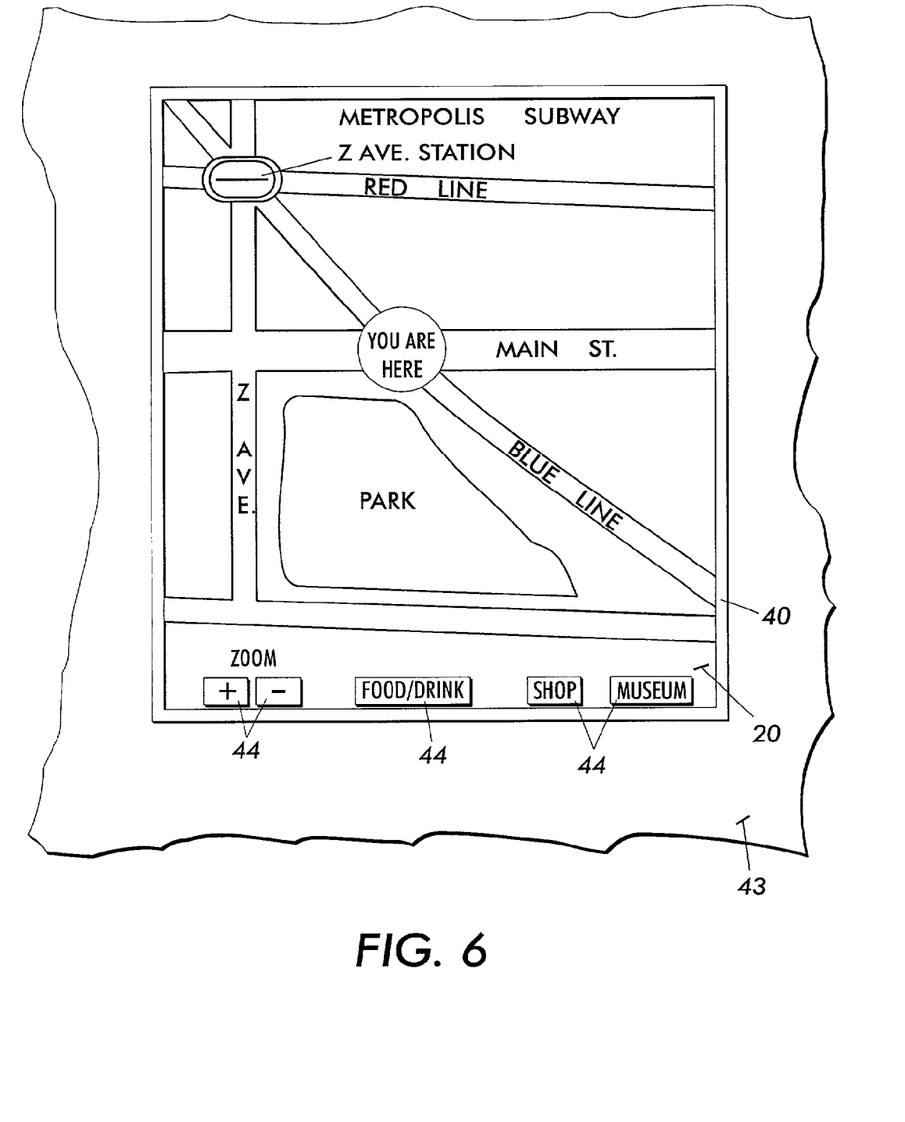

Referring next to FIG. 6, there is depicted a semi-permanent version of the present invention, where a significant portion or the entire substrate 20 is in the form of a flat, matted substrate, perhaps within a frame 40, hanging or otherwise mounted on a vertical surface such as wall 43. In the embodiment depicted, the substrate displays a map thereon. The map may be permanently printed on the substrate and information updated on the map, for example, to illustrate the location of mass transit vehicles such as subway trains; where real-time data updates would require the transmission of information from a source of vehicle information, perhaps broadcast and received by an associated, local radio receiver connected to the display In the embodiment depicted in FIG. 6, the entire substrate may be the display 32, where the information displayed may default to a map, but may change in its detail, or entirely alternative content, in response to an external signal. Another example of such a signal could be touch sensitive switches placed behind or in operative association with displayed buttons 44, where a series of display controls (e.g., zoom +/−) and display menu selections (food/drink, shop, museums, etc.) may be depicted, each of which might bring up a different display or map depicting the requested information. Such buttons could include matrix or pressure- or touch-sensitive sensors so as to sense contact with the surface of the substrate. A user seeking additional information about his/her present location could tap or touch the "you are here" location or button areas, to see more detailed information (restaurants, transportation, retail stores, lodging, etc.) much in the manner that information is provided to users of MapQuest® or similar software and world-wide web systems that are commonly available.

Therefore, as depicted in FIG. 6, the present invention may be used as a subway or public transportation interface where a user can selectively access maps, transportation schedules and routes, and even advertisements via a wall-mounted display substrate. Rather than an expensive computer-terminal kiosk, the present invention could be integrated within a wall-mounted frame accessible to the user. Furthermore, instead of the substrate itself, a frame or a cover glass may provide the touch-sensing capability, providing signals that would be provided to a display controller as described herein.

Use of a flexible display substrate with embedded memory as a piece of cloth or integrated into clothing or other coverings (e.g., wallpaper, framed pictures, etc.) would potentially include:

a) a changeable pattern using gyricon-type or other rewriteable substrate technology that can either be selected using external power or internal power sewn or otherwise connected therein;

b) changeable information messages such as a banner that scrolls across a hat, animated characters that move along a shirt, jacket or pants, programmable patterns including moving and securing them in a position when desired, such as to cover up a stain;

c) an outside lamination of an item such as a room divider or a wall (or desk, or file cabinet, or chair, etc), wherein the color and/or pattern of the wall or room divider can be changed from time to time as desired by the customer, and where the electronic circuitry drivers (not shown) affecting the change can either be part of the wall or room divider, or desk, or file cabinet, or chair, etc., or they can be imaged as needed by placing them against an imaging or "exposure" surface with drivers built in, or by using a handheld wand for electronically "refinishing" the image. The handheld device would contain the same type of EMF or electrostatic emitting waves that drivers in today's configuration use to alter the displayed images.

The techniques and embodiments for such a display could be applied to virtually any surface that can be covered with or made out of the various multi-state display technologies. These coverings (wall, surface, upholstery, etc.) can also serve as message boards, moving patterns, changing scenes, such as the outdoors, movies, pictures of vistas, harbors, mountains, etc.

In accordance with the various embodiments of the present invention already described, it is intended that the substrate itself provides the means for displaying, and possibly controlling or altering the information embedded therein or associated therewith. As is further depicted in the embodiment of FIG. 7, and as described, for example in U.S. Pat. No. 5,517,407 for a "DEVICE FOR INCLUDING ENHANCING INFORMATION WITH PRINTED INFORMATION AND METHOD FOR ELECTRONIC SEARCHING THEREOF" a "book" may have not only embedded memory associated therewith, but also may include flexible substrate pages for the display of information in the form of a "book." Such pages are suggested by the flexible-substrate (e.g., gyricon or e-ink) displays enabled by the techniques taught by Sheridon et al. in, for example, U.S. Pat. Nos. 5,708,525, 5,751,268, 5,914, 805 and 6,055,091 assigned to Xerox Corporation, and as also described by the MIT Media Lab in various papers prepared on electronic paper, electronic books and "e-ink" and U.S. Pat. Nos. 6,017,584, 6,124,851 and publication WO 00/67110, all of which are hereby incorporated by reference for their teachings. In particular, the system depicted in FIG. 6 is preferably comprised of a substrate 20 that is a twisted-ball (or twisted-cylinder), or electrophoretic ink display capable of outputting the information stored in the embedded memory 22 associated therewith. It is further conceivable, as depicted in FIG. 6, that the substrate is formed using the techniques proposed by Sheridon, and includes a power supply 36 (e.g., lithium battery such as employed in watches, rechargeable batteries, a photovoltaic energy supply, or an AC adapter) as well as user-interface buttons or keys 24 (page forward, page back). In operation, the information stored in the embedded memory 22 is displayed as a series of pages, perhaps imitating a book format, where the substrate 20 is oriented in a landscape orientation, and where the substrate includes a pair of opposing "pages" 26 separated along centerline 28. For further description of the details of an electronic book, the teachings of U.S. Pat. No. 5,517,407 to Weiner are hereby incorporated by reference.

Figure 7:
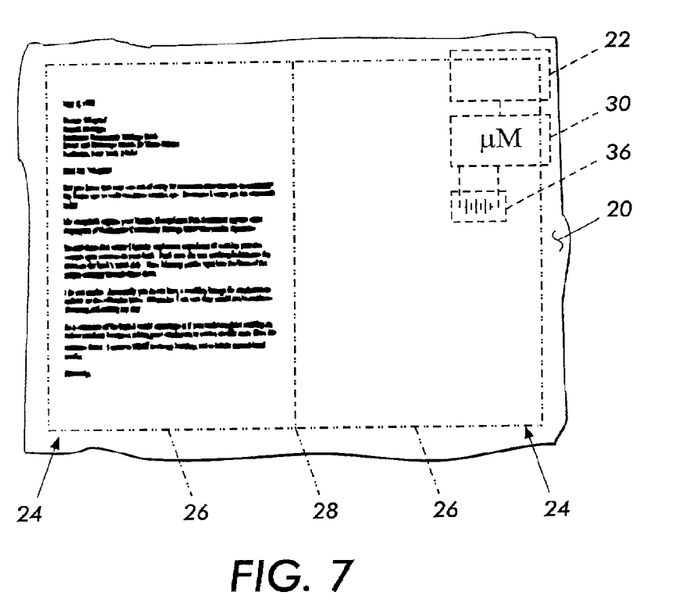

In such an embodiment, a user who wishes to read the "contents" of the book that are stored on the digital recording medium would simply push or touch the location indicated by the buttons 24 to move the displayed pages forward or backward. As will be appreciated by those skilled in the art, buttons 24 require a pressure- or touch-sensitive switch that is associated with the embedded memory 22. In addition, the substrate would require circuitry, possibly an embedded processor or controller 30, suitable for updating the displayed information in response to a user request (e.g., depressing page buttons 24).

Figure 8:
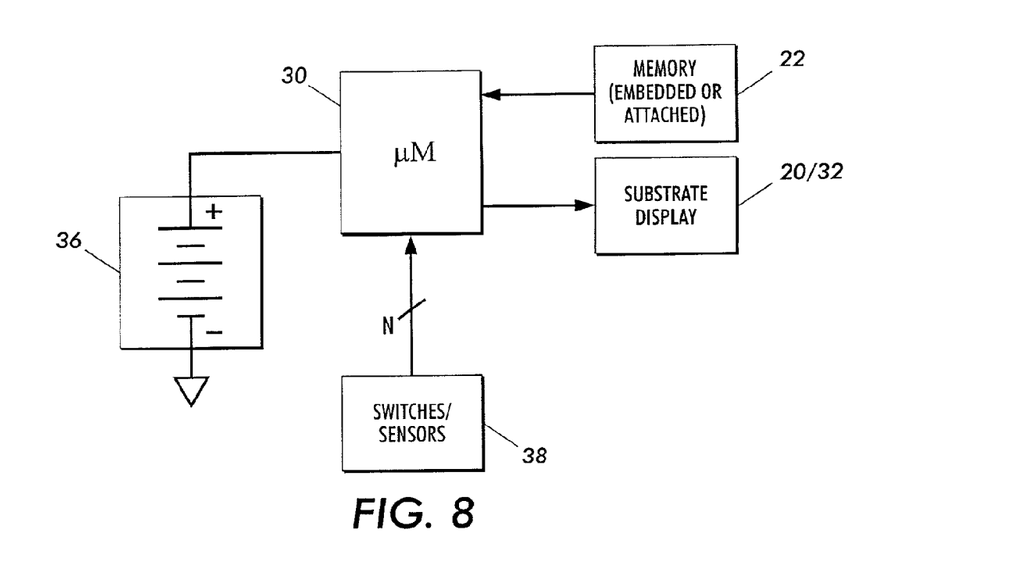
FIG. 8 is a block diagram of circuitry employed in accordance with the present invention.

It will be further appreciated that any such embedded memory, operating in conjunction with a display capability as described herein may require circuitry for reading the information stored on the embedded memory and transferring and/or processing the information for display. A simple block diagram of such a system is depicted in FIG. 8. In the system, a microcontroller 30 (possibly including a connector/port operatively associated therewith) or similar device is used to read information from memory 22. The data read from the memory is then processed so as to make it suitable for driving a substrate-integrated display 20 or 32. It will be appreciated that the function of the controller 30 may simply be as a video driver, controlling signals suitable for displaying the data stored in memory. However, controller 30 may be enhanced to further receive inputs from other sources such as switches (user manual inputs) or similar sensors (visible light, infrared radiation, pressure, audio, etc.) that will allow the system to respond to external conditions. It will be further appreciated that the power for generation of a sensor signal may be derived from the sensors themselves, for example a pressure sensor could employ a piezoelectric or triboelectric effect while an optical sensor signal could be generated by a photovoltaic effect.

As described above, the user operable switch(es) or sensors may enable selection of the information to be displayed, such as pages of a book. The addition of a light sensor might allow the display to adjust brightness or contrast, or mode (dark text on light background or light text on dark background) in response to the level of light detected.

Additional alternative embodiments of the electronic substrate display include a means for downloading information to the embedded memory, such as a direct port connection. In addition to the methods and techniques described above, it may also be possible to employ radio-frequency (RF) of infra-red (IR) transmission mechanisms, with a suitable port or receiver connected to or associated with the substrate, so as to allow content to be downloaded from computer or other information terminals. For example, the "book" embodiment of FIG. 7 contemplates the ability to insert the substrate into the paper feed tray of a copier/scanner, wherein digital copies of each of a plurality of documents are scanned and then stored on the embedded memory 22 for subsequent display on the regions 26 of the substrate. In this manner, a user may view a collection of scanned documents, e-mail, recipes, bank statements, newspaper, etc. In a further alternative, it may be possible to download the information from an optical memory card, such as that described in U.S. Pat. No. 4,835,376, or a computer able to load data into the embedded memory.

In yet a further alternative embodiment, a system employing the substrate to display a map could interface to a global-positioning system (GPS), where the location coordinates could automatically be updated on the map, showing the user his/her direction of travel, and possible progress since the last updated position. An example of a system providing such information in a laptop interface, is found in DeLorme's Earthmate® Road Warrior and Earthmate® GPS Receiver. More specifically, a portable GPS device may be connected to a display operating in accordance with the invention described above, so that a map (preprinted or stored on memory associated with the display) is able to be updated to show a users current location. It is understood that such an application will require communication of the scale and coordinate coverage of a particular map being displayed, which could be embedded in the map in a chip or other media which makes contact with the GPS, such as by pin contacts, or other interface mechanism. Additionally, one might embed or mount onto a printed map which has gyricon or e-ink type capability this system and rewrite the entire map, including where you are, and even enlarge the map to scale or shrink it like the maps on interactive map/direction web sites.

Figure 9:
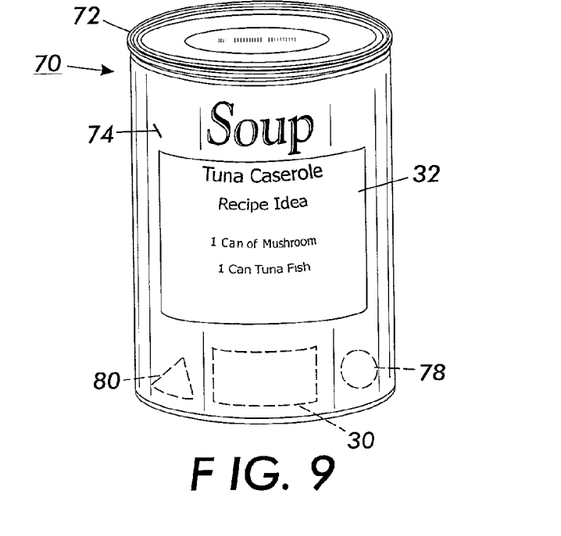
FIGS. 9 and 10 are perspective illustrations of alternative embodiments for aspects of the present invention.
Figure 10:
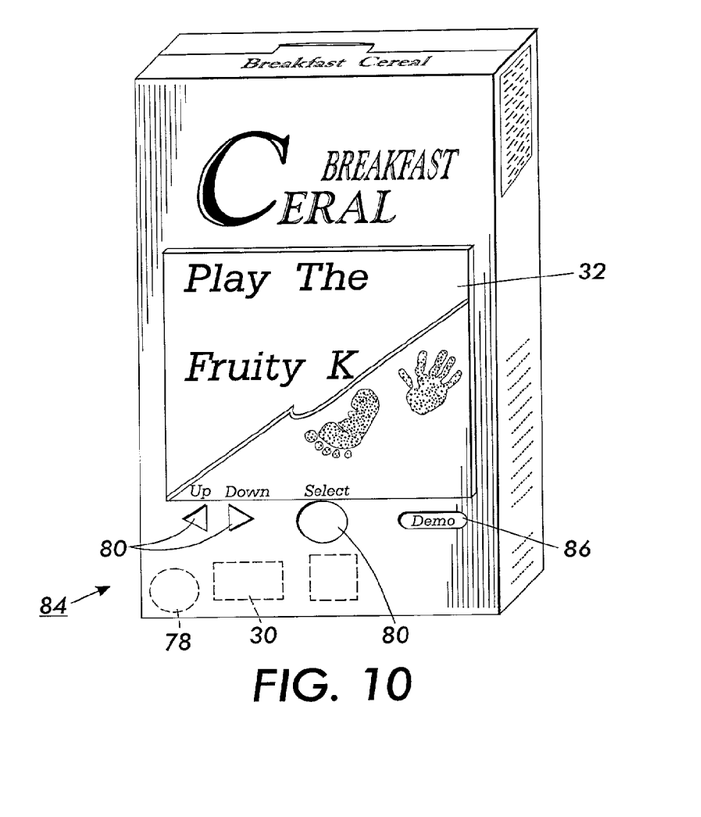

Turning next to FIGS. 9 and 10, two alternative applications of the present invention are depicted. In particular, the embodiments depicted in FIGS. 9 and 10 include use of a substrate having memory and an associated display mechanism so as to enable a product or a product's packaging to be interactive and to provide information or other feedback in response to a user. As depicted in FIG. 9, a can of soup 70, or similar good, may include a container 72 that is at least partially surrounded by a label substrate 74. Substrate 74 may further include various elements described above so as to allow the product label to be programmable and interactive. For example, a portion of the label may be a display 32 made of gyricon or electrophoretic ink material. Display 32 may be further connected to and controlled by a micro controller 30 or similar programmable device having a memory (not shown) associated therewith to store information to be selectively displayed. Also included in, or associated with, the label substrate is a power source 78 in the nature of a small battery or a photovoltaic cell. In a nominal condition, display 32 may simply depict the traditional label image or information. However, display 32 may also depict additional product information (e.g., ingredients list or nutritional information, perhaps in multiple languages). Furthermore, additional information such as suggested recipes might be stored and displayed on such labels, perhaps in response to user selections via a touch-sensitive switch or sensor 80. It will be appreciated that sensor 80 may be a pressure sensitive switch or matrix, or may be in the nature of one of the sensors described above.

Figure 11:
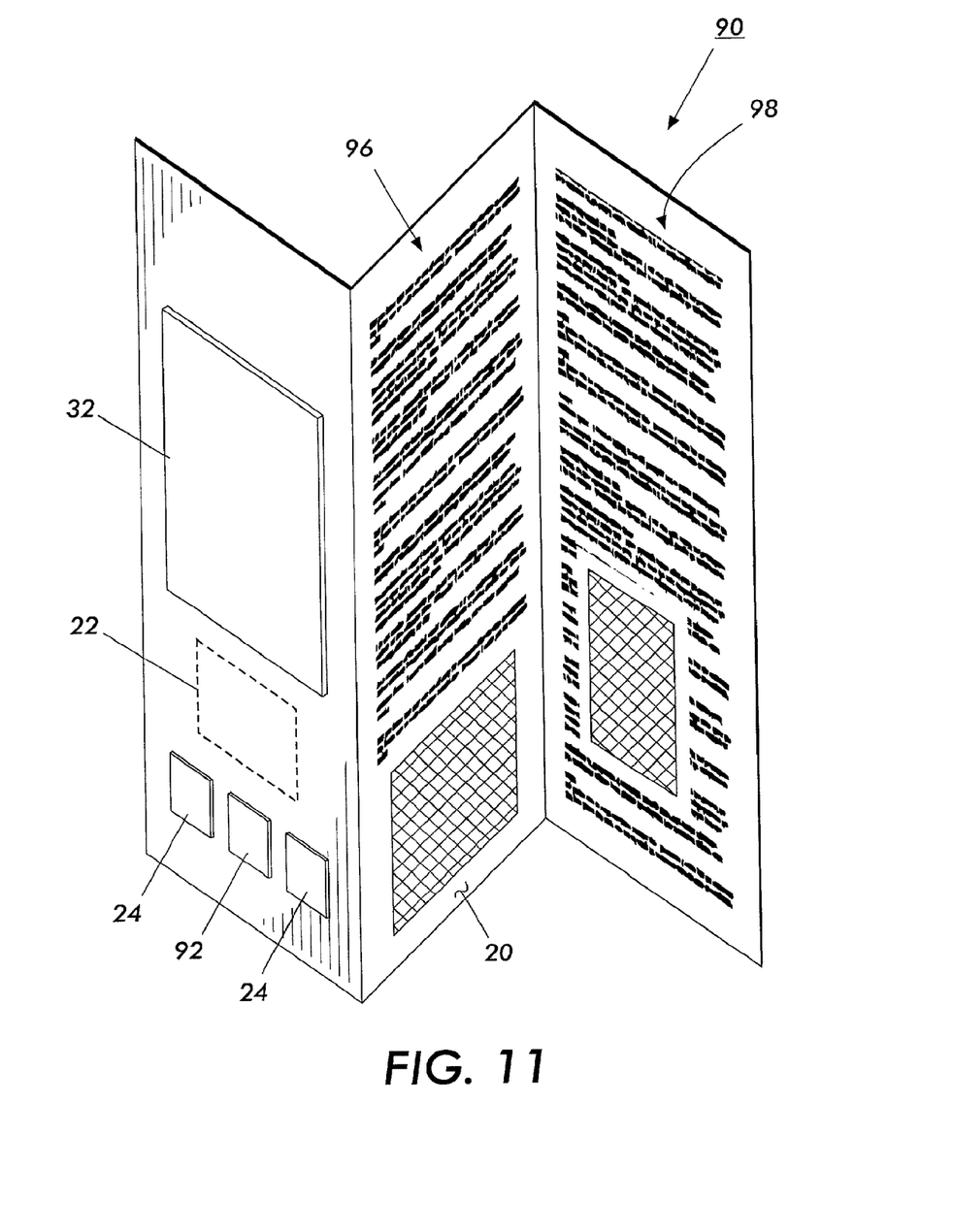
FIG. 11 is a perspective illustration of another alternative embodiment of the apparatus depicted in FIG. 7.

Referring to FIG. 11, a similar embodiment for the present invention is displayed, where the substrate is the product packaging, this time in the nature of a cereal box 84. It will be appreciated that various packaging materials might seek to employ such an invention, including fast-food franchises catering to children with childrens meals in a box. Box 84 preferably includes a semi-rigid paperboard substrate having a display 32 and other components associated with it. Here again, display 32 may be formed in association with the substrate, or may be added at a point during the preparation of the packaging. For example, as will be described in further detail below, the entire display, control, memory and power apparatus may be prefabricated and simply affixed to the box as it is being manufactured.

In addition to a display associated with a paperboard container 86, cereal box 84 also includes a power source 78, a controller 30, and a separate memory 22. It is further contemplated that the box may be constructed in such a manner as to allow a user to interact with the display through touch/pressure sensitive sensors 80. Moreover, although it may be possible to allow potential consumers (children who purchase for the game and parents who purchase for the food contained in the box) to see a demo of the game on the display by pressing button 86 (DEMO), it is further contemplated that the full game may not be available or usable until a sensor (not shown) located inside the box 84 is activated. In other words, a demo of the game could be seen, however, a purchase of the goods must be completed in order to access the contents and activate the sensor to enable the complete game. As used herein, the term game is intended to include not only interactive video games as are well known, but also various contests requiring disclosure of participation rules, or other information of interest to those inclined to read cereal boxes and other product packaging.

FIG. 11 is a perspective illustration of an alternative embodiment of the apparatus depicted in FIG. 7, where substrate 20 has been produced in the form of a tri-fold brochure 90. In the embodiment depicted, brochure 90, includes a paper or similar substrate 20 and a display 32. Again, the information available for display is retained within a memory 22, which is in turn accessed (read from and written to) via the methods described herein, and includes a controller and power source (not shown) so as to be responsive to a readers selection through pressure sensitive buttons 24 or other suitable sensing or signalling mechanisms. It is also contemplated that the embodiment of FIG. 11, or other alternatives described herein, may include a thin, flat speaker 92, suitable for replaying audio information stored in memory 22 as well. As indicated in regions 96 and 98, brochure 90 may also include information printed on substrate 20 in a conventional fashion.

Figure 12:
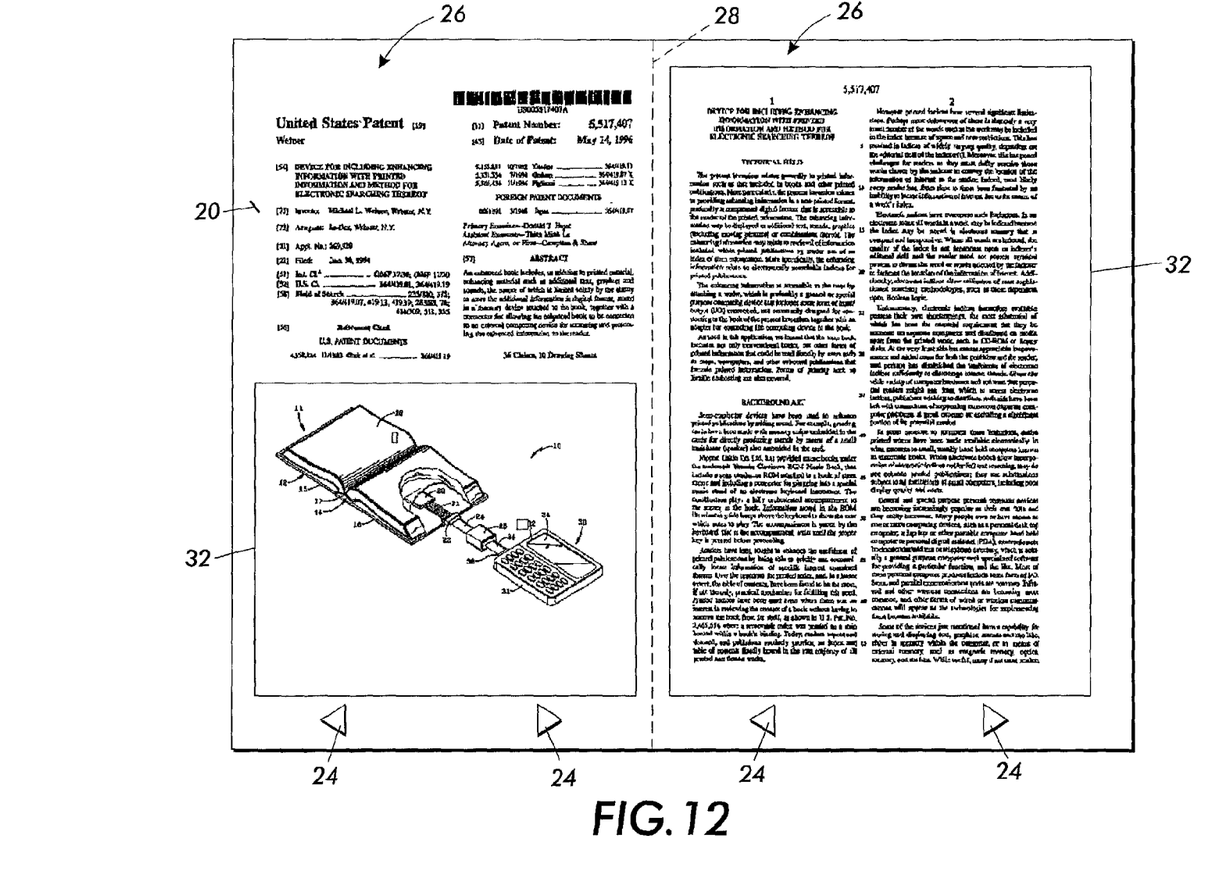
FIG. 12 is an exemplary illustration of an "electronic patent" embodiment in accordance with aspects of the present invention.

FIG. 12 is yet another possible application of the present invention, this time as an "electronic patent." In the embodiment depicted, it is contemplated that, much like the embodiment of FIGS. 7 and 11, a patent may be printed using one or more display substrates 32 on a common substrate 20 so as to display all or parts of an issued patent. In this way, as such substrates become common and less expensive to manufacture, the patent could be "printed" on a single substrate having the ability to display images in one region thereof and textual information in the other. Moreover, pressure sensors underlying buttons 24 could be used to allow a user to scroll through the images and textual columns of the patent. Depending upon the length of the patent and the size of the memory (not shown) associated with the substrate, it is also conceivable that appendices and other information may be provided with the "electronic patent."

Figure 13:
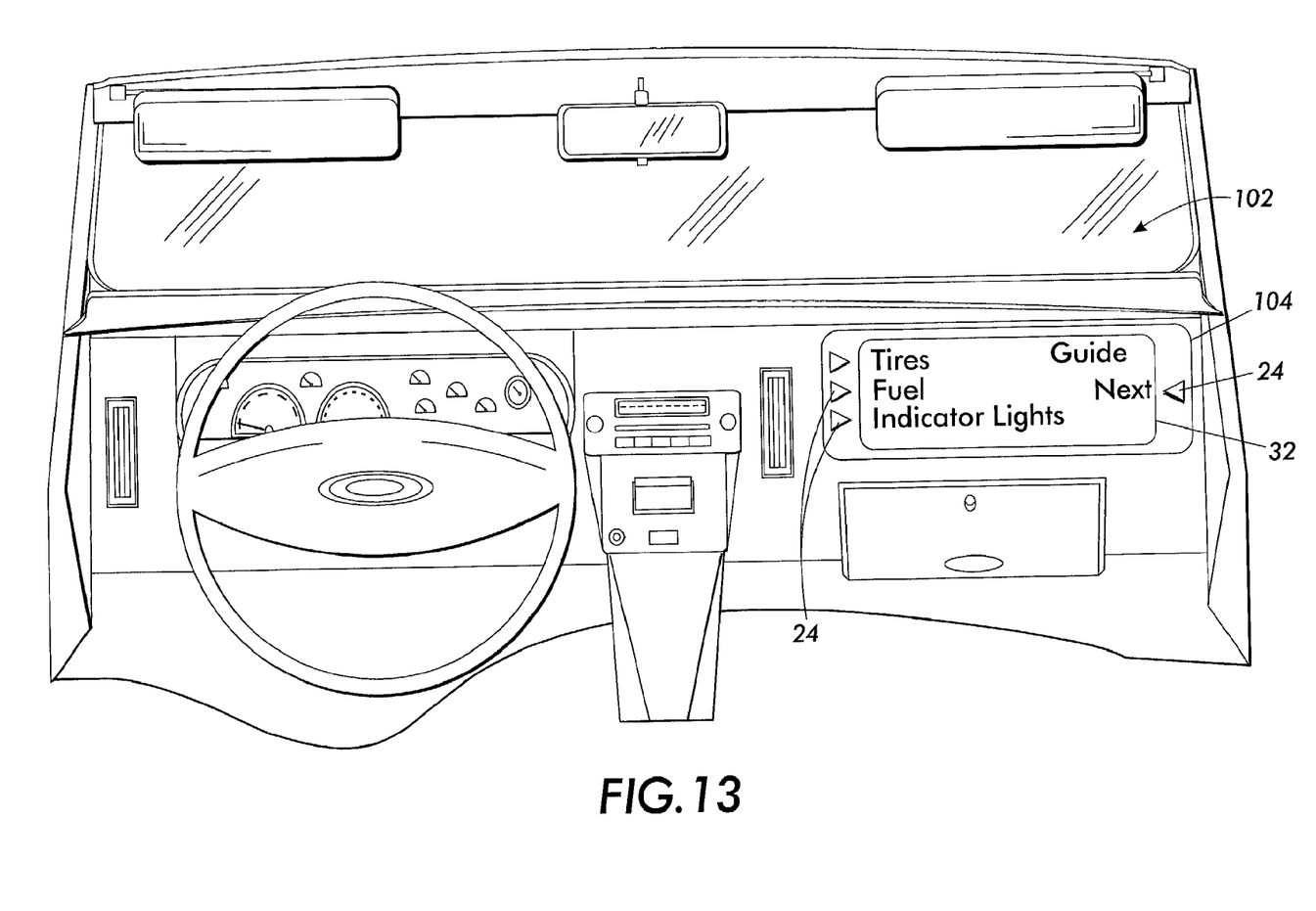
FIG. 13 is an orthographic representation of an embodiment in which the present invention is integrated with a well-known product as a visual reference.

FIG. 13 is an orthographic representation of an embodiment in which the present invention is integrated into the dashboard 102 of a vehicle. As depicted by this embodiment, the present invention may be integrated with a component of the product it is intended to be used with of for. Accordingly, the usefulness of the product may be maximized, as relevant information is made immediately available to the user. Returning to the Figure, dashboard 102 includes a complete substrate 104 with a memory (not shown), display substrate 32, power source (not shown), touch sensors 24 and control logic (not shown), all integrated into a small panel that may be affixed to the dashboard of an automobile or within a glove or other compartment.

In the embodiment depicted, the memory (not shown) may be pre-loaded with information relating to various features of the vehicle or product or a complete user and service manual. It is also possible that the memory associated with the display may be updateable, so that when the vehicle or product is serviced, the service or other current information can be recorded in the memory for subsequent retrieval or display.

Figure 14:
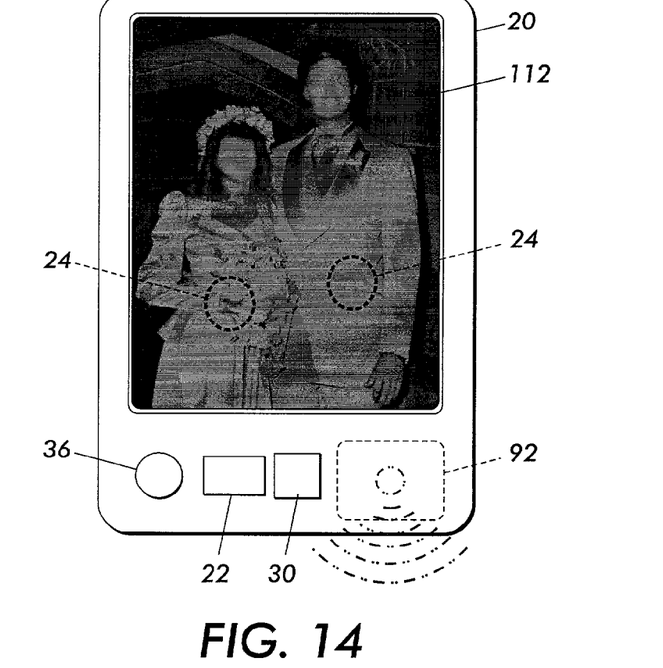
FIG. 14 is an illustration of an application of the present invention in association with the display of a photographic image, including additional output features.

Turning next to FIG. 14 there is depicted another application of the present invention in association with a photographic image 112. The present invention is contemplated for use as a backing material for a photographic substrate, where the invention may store digital audio information on memory 22 for replay to a viewer of

20 the photograph. Furthermore, the application can be provided with an adhesive layer to affix it to the photograph, or without adhesive to allow it to be reused with multiple photographs, for example, within a frame.

More, specifically, one or more touch sensitive switches 24 may be employed at positions behind, or embedded within, the photographic substrate, to sense pressure exerted by a viewer. Upon sensing such pressure, the switches signal controller 30 to begin downloading and replaying digital audio information stored in the memory 22; the digital audio information being converted to signals suitable for creating audible information via speaker 92. In such a situation, it may not be necessary to include a display 32, particularly if the substrate is used for a photograph. However, the embedded memory remains and the speaker becomes an additional or alternative means for representing the information stored in the memory 22. It is also contemplated that the embodiment of FIG. 14 may include one or more regions that employ a display substrate (not shown).

Figure 15:
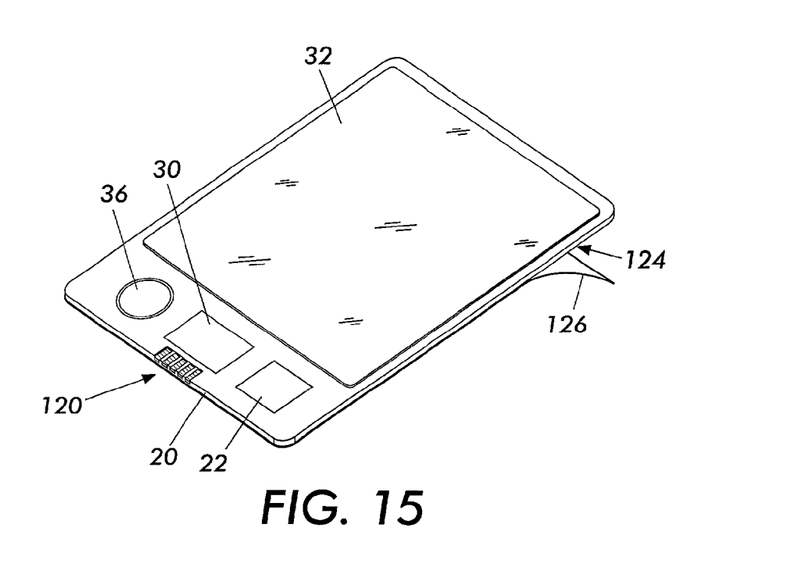
FIG. 15 is a perspective view of a self-adhesive backed substrate as may be practiced in accordance with aspects of the present invention.
Figure 16:
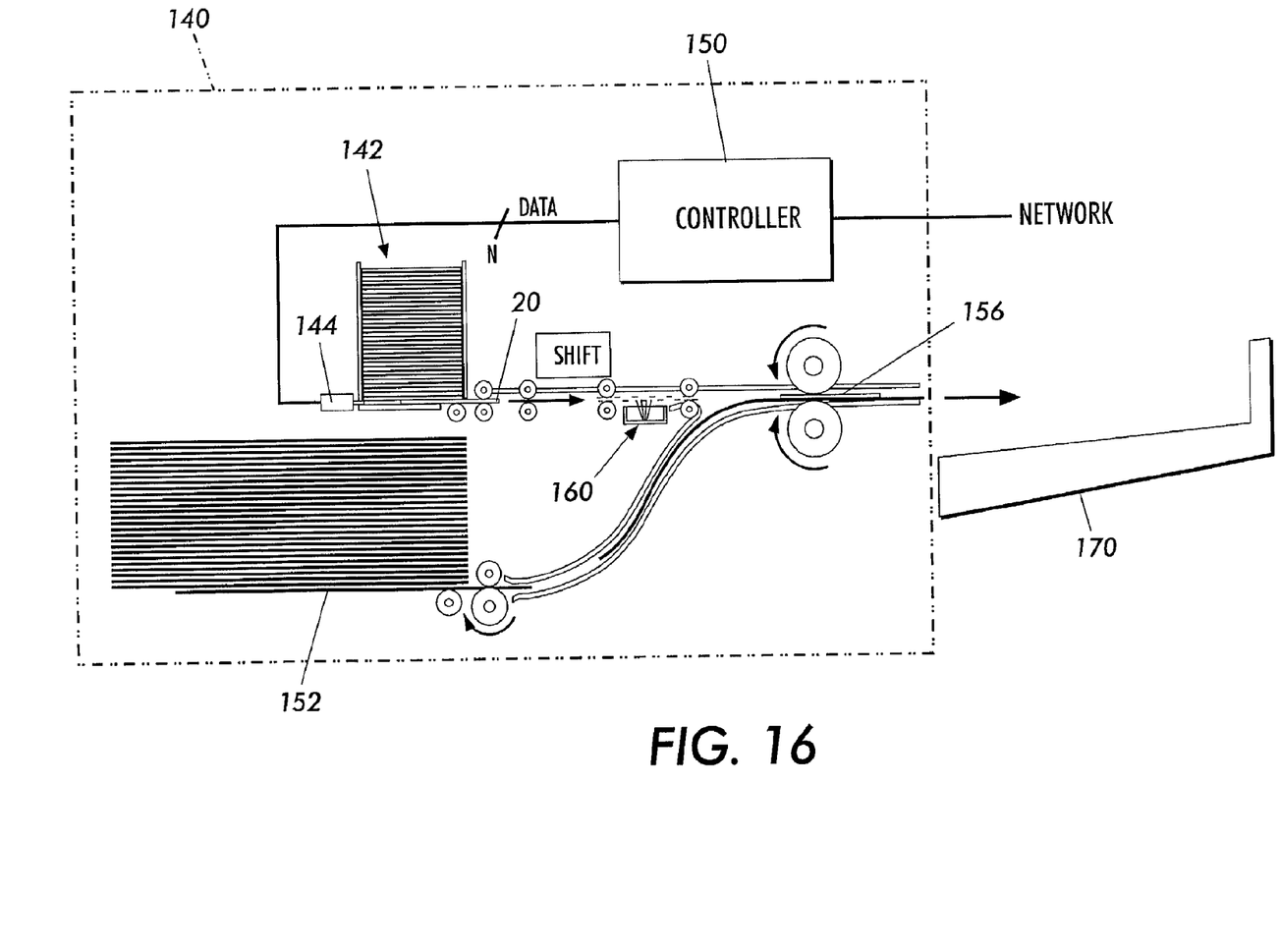
FIG. 16 is a side view of a machine suitable for the mass production of substrates in accordance with the present invention.

Turning lastly to FIGS. 15 and 16, depicted therein is an embodiment of the present invention made for ready attachment to other substrates, and a simple machine for facilitating such attachment. More specifically, FIG. 15 is a perspective view of a self-adhesive backed substrate 20. Substrate 20 includes various elements previously described, such as a power source 36, controller 30 and memory 22 all interconnected via circuitry and a controller so as to enable the information stored in memory 22 to be displayed via display 32. In the event that the substrate needs to be updated or reprogrammed, an optional connector 120 that is ported to the controller is included. It should be further appreciated that substrates such as those depicted in FIG. 15 are suitable for affixation to any surface, including other substrates, brochures such as described above, etc. The substrate may be affixed to another surface by removing a backing sheet 126 so as to reveal a self-stick or adhesive layer 124 on the rear surface of the display substrate. It is also contemplated that an individual, located for example at a computer workstation where programming of memory 22 can be automated, may produce a low-volume quantity of such substrates.

FIG. 16 is a side view of a machine suitable for the mass production of substrates such as those depicted in FIG. 15, including the application of an adhesive and affixation to another sheet or substrate. Referring to FIG. 16, depicted therein is an assembly apparatus suitable for affixing one or more display substrates and components associated therewith to a secondary or backing sheet or substrate. More particularly, the machine 140 includes a hopper or input stack 142 that contained a plurality of substrates 20 (preferably including a memory and a display) arranged with bottom feeding as is known in the paper feeding arts. One modification to the hopper 142 may be the addition of an interface 144 suitable for connecting to and programming the memory in the memory/display substrate in the event that the substrates are not pre-programmed. A similar hopper 146 is provided for the storage or staging of backing sheets or pages that are to have memory/display substrates attached thereto.

In response to a network command to prepare one or more of such memory/display substrates affixed to a sheet, controller 150 initiates a process whereby substrate 20 and sheet 152 are fed. Once separated from their respective stacks, the substrate and sheet are advanced toward a nip 156, where the two components are to be forced into contact with one another, attempting to affix one to the other. Initially, substrate 20 may be shifted in position (perpendicular to the feed direction) so as to align the substrate with a desired position on the sheet 152. Once shifted, a glue or similar adhesive material may be applied to the underside of the substrate 20, using a brush/reservoir combination 160, before the substrate is placed into contact with the sheet. Once contacted, the two components are fed through a nip 156, where they are joined by the application of pressure at the nip, and are then fed to output tray 170. In this manner, a memory/display substrate may be prepared and affixed to the surface of any printed goods (e.g., cereal cartons, can labels, etc.).

In recapitulation, the present invention is an apparatus for the electronic display of information, where the apparatus is a substrate incorporating a digital recording medium attached to or embedded within the substrate. The substrate further includes a flexible-substrate display located on an exposed surface of the substrate, where the display is a display medium capable of selectively displaying one of at least two possible colors at each pixel location thereon in order to produce a substrate medium that may be modified in accordance with a users request.

It is, therefore, apparent that there has been provided, in accordance with the present invention, an apparatus for the electronic display of information. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. An apparatus for the electronic display of information on a consumer good, comprising:
   a flexible substrate with which the apparatus is permanently associated;
   a digital recording medium associated therewith, where information is stored by the digital recording medium;
   an updateable, flexible substrate display located on an exposed surface of the apparatus, wherein said substrate display includes a display medium capable of selectively displaying one of at least two possible colors at a plurality of pixel locations thereon;
   where the flexible substrate display changes state in response to a signal generated from information stored in the digital recording medium;
   a portable power supply for providing power to said digital recording medium and said substrate display; and
   at least one user-interactive element that allows a user to selectively alter the display of information on the substrate display, wherein said user-interactive element includes a touch-sensitive device associated with the substrate.

2. The apparatus of claim 1, wherein the substrate is employed to display and update textual and graphic information in the nature of a map.

3. An apparatus for the electronic display of information on a consumer good, comprising:
   a flexible substrate with which the apparatus is permanently associated;
   a digital recording medium associated therewith, where information is stored by the digital recording medium;
   an updateable, flexible substrate display located on an exposed surface of the apparatus, wherein said substrate display includes a display medium capable of selectively displaying one of at least two possible colors at a plurality of pixel locations thereon;
   where the flexible substrate display changes state in response to a signal generated from information stored in the digital recording medium;
   a portable power supply for providing power to said digital recording medium and said substrate display; and
   at least one user-interactive element that allows a user to selectively alter the display of information on the substrate display, wherein the substrate is employed to display and update textual and graphic information in the nature of a book.

4. An apparatus for the electronic display of information on a consumer good, comprising:
   a flexible substrate with which the apparatus is permanently associated;
   a digital recording medium associated therewith, where information is stored by the digital recording medium;
   an updateable, flexible substrate display located on an exposed surface of the apparatus, wherein said substrate display includes a display medium capable of selectively displaying one of at least two possible colors at a plurality of pixel locations thereon;
   where the flexible substrate display changes state in response to a signal generated from information stored in the digital recording medium, and wherein the substrate is used to produce an article of clothing and is employed to display graphic information thereon;
   a portable power supply for providing power to said digital recording medium and said substrate display; and
   at least one user-interactive element that allows a user to selectively alter the display of information on the substrate display.

5. The apparatus of claim 4, wherein the graphic information is related to an advertisement and includes at least a product identifier.

* * * * *